United States Patent
Bookbinder et al.

(10) Patent No.: US 10,501,370 B2
(45) Date of Patent: Dec. 10, 2019

(54) METHOD OF APPLYING AN INK LAYER ONTO AN OPTICAL FIBER

(71) Applicant: Corning Incorporated, Corning, NY (US)

(72) Inventors: Dana Craig Bookbinder, Corning, NY (US); Robert Clark Moore, Wilmington, NC (US); Darren Andrew Stainer, Wrightsville, NC (US); Pushkar Tandon, Painted Post, NY (US); Ruchi Tandon, Painted Post, NY (US); Michael James Todt, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/184,069

(22) Filed: Nov. 8, 2018

(65) Prior Publication Data

US 2019/0177216 A1 Jun. 13, 2019

Related U.S. Application Data

(60) Provisional application No. 62/595,799, filed on Dec. 7, 2017.

(30) Foreign Application Priority Data

Jan. 25, 2018 (NL) .................................... 2020318

(51) Int. Cl.
*C03C 25/1065* (2018.01)
*C03B 37/025* (2006.01)
(Continued)

(52) U.S. Cl.
CPC ........ *C03C 25/1065* (2013.01); *C03B 37/025* (2013.01); *C03C 25/285* (2013.01);
(Continued)

(58) Field of Classification Search
CPC ............ G02B 6/02395; C03C 25/1065; C03C 25/285; C03B 37/025
See application file for complete search history.

(56) References Cited

U.S. PATENT DOCUMENTS

| | | | | | |
|---|---|---|---|---|---|
| 4,629,285 | A | * | 12/1986 | Carter | G02B 6/4482 |
| | | | | | 174/112 |
| 6,054,217 | A | * | 4/2000 | Szum | G02B 6/4403 |
| | | | | | 385/115 |

(Continued)

FOREIGN PATENT DOCUMENTS

| EP | 2385027 A1 | 11/2011 |
|---|---|---|
| EP | 2645143 A1 | 10/2013 |
| WO | 2007064725 A2 | 6/2007 |

OTHER PUBLICATIONS

NL2020318 Search Report dated Sep. 19, 2018; 11 Pages; European Patent Office.

(Continued)

*Primary Examiner* — Thomas A Hollweg
*Assistant Examiner* — Mary A El-Shammaa
(74) *Attorney, Agent, or Firm* — Kevin L. Bray

(57) ABSTRACT

An optical fiber and its manufacture are provided. The optical fiber includes an optical waveguide and a cured primary coating layer surrounding the optical waveguide. The optical fiber further includes a cured secondary coating layer surrounding the cured primary coating layer. The optical fiber further includes a cured tertiary ink coating layer surrounding the cured secondary coating layer. The cured tertiary ink coating layer has a glass transition temperature ($T_{g\text{-}ink}$) of greater than or equal to 75° C.

17 Claims, 6 Drawing Sheets

(51) Int. Cl.
*C03C 25/285* (2018.01)
*G02B 6/02* (2006.01)
*G02B 6/036* (2006.01)

(52) U.S. Cl.
CPC ......... *G02B 6/02395* (2013.01); *G02B 6/036* (2013.01); *C03C 2217/78* (2013.01)

(56) References Cited

U.S. PATENT DOCUMENTS

| | | |
|---|---|---|
| 6,326,416 B1 | 12/2001 | Chien et al. |
| 6,531,522 B1 | 3/2003 | Winningham |
| 6,539,152 B1 | 3/2003 | Fewkes et al. |
| 6,563,996 B1 | 5/2003 | Winningham |
| 6,849,333 B2 | 2/2005 | Schissel et al. |
| 6,869,981 B2 | 3/2005 | Fewkes et al. |
| 7,923,483 B2 | 4/2011 | Chien et al. |
| 8,351,749 B2 | 1/2013 | Konstadinidis et al. |
| 8,452,146 B2 | 5/2013 | Schiaffo et al. |
| 2003/0123839 A1 | 7/2003 | Chou et al. |
| 2003/0176522 A1* | 9/2003 | Komiya ............... C03C 25/106 522/71 |
| 2004/0062501 A1* | 4/2004 | Abel .................. C03C 25/1065 385/128 |
| 2007/0122093 A1 | 5/2007 | Chien et al. |
| 2017/0107145 A1 | 4/2017 | Suyama et al. |

OTHER PUBLICATIONS

International Search Report and Written Opinion PCT/US2018/064379 dated Feb. 27, 2019, 14 Pgs.

\* cited by examiner

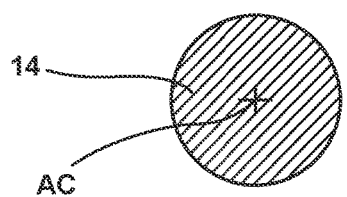
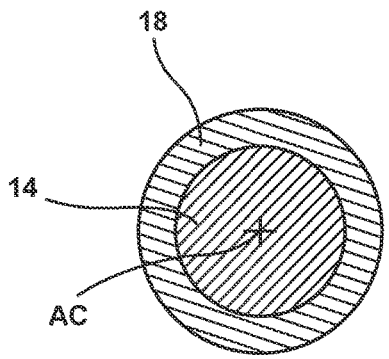
FIG. 4A  FIG. 4B
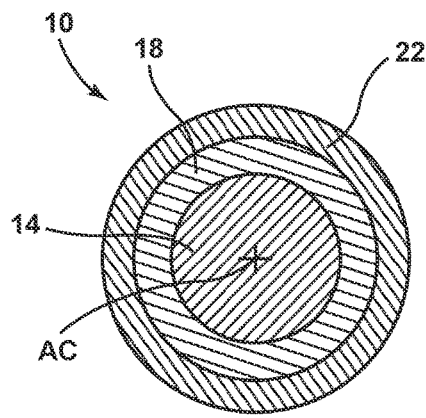
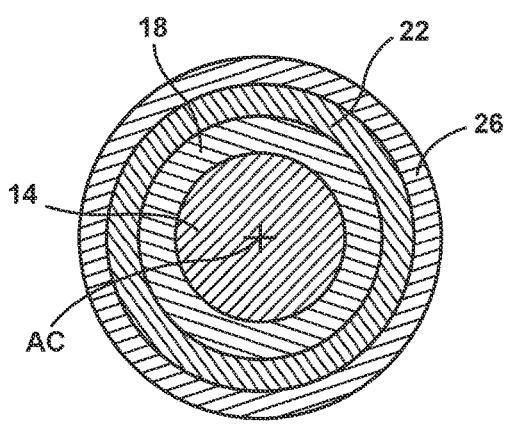
FIG. 4C  FIG. 4D

METHOD OF APPLYING AN INK LAYER ONTO AN OPTICAL FIBER

This application claims the benefit of priority to Dutch Patent Application No. 2020318, filed on Jan. 25, 2018, which claims the benefit of priority to U.S. Provisional Application Ser. No. 62/595,799 filed on Dec. 7, 2017, the content of which is relied upon and incorporated herein by reference in its entirety.

TECHNICAL FIELD

The present disclosure generally relates to the field of optical fibers and the manufacturing thereof, and more particularly, relates to the addition of an outer ink layer having a high modulus that contributes to the abrasion and puncture resistance performance of the optical fiber.

BACKGROUND

Optical fibers typically have a glass core that is manufactured from a glass body, usually called a preform. Using a process known in the art as "drawing," the glass preform is placed at the top of a fiber drawing tower where it is heated in a furnace to a temperature that is sufficiently high to soften a bottom portion of the preform where the softened material is stretched by a series of steps to form an optical fiber glass core. The glass core is generally surrounded by additional layers of glass having a refractive index lower than that of the core. These surrounding layers are generally referred to as cladding. The glass core and the surrounding cladding layers are typically referred to as "an optical waveguide."

Over the cladding there are often two or more superimposed polymer layers that form a coating system. Usually, this coating system is applied directly onto the optical waveguide during the drawing process. The coating layers are in direct contact with the optical waveguide or glass core so that the coating system can help to absorb forces applied to the coated optical fiber. Subsequent losses associated with the coating layers provide protection against microbending that can lead to attenuation of the signal transmission capability of the coated optical glass fiber.

Improvements in the process for coating the optical waveguide and changes in the chemistry and resulting properties of the coating layers can have dramatic effects on the final optical fiber produced.

SUMMARY

According to one embodiment, an optical fiber is provided. The optical fiber includes an optical waveguide and a cured ink coating layer surrounding the optical waveguide. The cured ink coating layer comprises a coloring agent and has a glass transition temperature ($T_{g-ink}$) of greater than or equal to 75° C.

According to another embodiment, an optical fiber is provided. The optical fiber includes an optical waveguide, a cured primary coating layer surrounding the optical waveguide, and a cured secondary coating layer surrounding the cured primary coating layer wherein the cured secondary coating layer has a glass transition temperature ($T_{g-sec}$) that is greater than or equal to 75° C. The optical fiber further includes a cured tertiary ink coating layer surrounding the cured secondary coating layer, the cured tertiary ink coating layer comprising a coloring agent, wherein the cured tertiary ink coating layer has a glass transition temperature ($T_{g-ink}$) of greater than or equal to 75° C.

According to another embodiment, a method for manufacturing an optical fiber is provided. The method includes drawing an optical waveguide from a glass preform, applying a secondary coating material to surround the optical waveguide, curing the secondary coating material to form a cured secondary coating layer, applying an ink coating material to surround the secondary coating layer using an ink application device, the ink layer coating material comprising a coloring agent, and curing the ink coating material to form a cured ink coating layer. The cured ink coating layer has a glass transition temperature ($T_{g-ink}$) of greater than or equal to 75° C. and optical waveguide is drawn at a rate greater than 30 m/s. The temperature of the cured secondary coating ($T_{sec}$) entering the ink layer applicator is less than or equal to $T_{g-ink}+40°$ C. In some embodiments, the temperature to the cured secondary coating ($T_{sec}$) entering the ink layer applicator is less than or equal to $T_{g-ink}+20°$ C. In other embodiments, the temperature of the cured secondary coating ($T_{sec}$) entering the ink layer applicator is less than or equal to $T_{g-ink}+10°$ C. In still other embodiments, the temperature of the cured secondary coating ($T_{sec}$) entering the ink layer applicator is less than or equal to $T_{g-ink}$.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

The accompanying drawings are included to provide a further understanding, and are incorporated in and constitute a part of this specification. The drawings illustrate one or more embodiments, and together with the description serve to explain principles and operation of the various embodiments.

FIGS. 4A-4D provide various cross-sectional views of the optical fiber taken at points along the optical fiber manufacturing process presented in FIG. 3;

DETAILED DESCRIPTION

Figure 1:
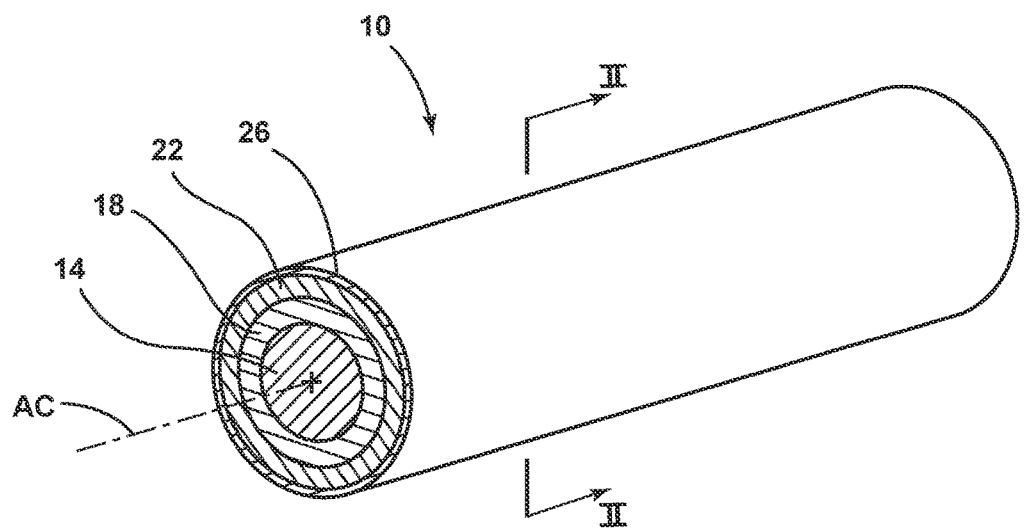
FIG. 1 is a side perspective view of an optical fiber according to one embodiment of the present disclosure.

Additional features and advantages will be set forth in the detailed description which follows and will be apparent to those skilled in the art from the description or recognized by practicing as described in the following description together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, "UV" refers to ultraviolet.

Referring to FIGS. 1-7, reference number 10 generally designates an optical fiber. The optical fiber 10 includes an optical waveguide 14 and a cured primary coating layer 18 surrounding the optical waveguide 14. The optical fiber 10 further includes a cured secondary coating layer 22 surrounding the cured primary coating layer 18. The optical fiber 10 still further includes a cured tertiary ink coating layer 26 surrounding the cured secondary coating layer 22. The cured tertiary ink coating layer 26 has an ink coating glass transition temperature ($T_{g\text{-}ink}$) of greater than or equal to 75° C.

Traditional optical fiber manufacturing technologies require the application of two or more UV curable acrylate polymers to be provided as coatings to provide bend and damage resistance for the fiber. Additional coating layers, such as ink layers used to identify the type of optical fiber, are applied in a separate off-line process. These separate off-line processes contribute to increased expense and decreased efficiency in producing traditionally manufactured optical fibers. The process disclosed herein applies the cured tertiary ink coating layer 26 during the drawing process to eliminate an extra off-line process step thus lowering the optical fiber 10 manufacturing cost. The process and resulting properties of the layer of ink coating material 26 are discussed herein since these properties can impact fiber performance characteristics such as, for example, wind defects and adhesion performance when used in ribbons.

Referring to FIG. 1, a side view of the optical fiber 10 is provided. The optical fiber 10 has a centerline AC and a radial coordinate r. The optical fiber 10 includes the optical waveguide 14 surrounded and/or coupled to the cured primary coating layer 18. The cured secondary coating layer 22 is positioned around the cured primary coating layer 18. The cured tertiary ink coating layer 26 provides the outermost surface of the optical fiber 10 by covering and surrounding the cured secondary coating layer 22.

Figure 2:
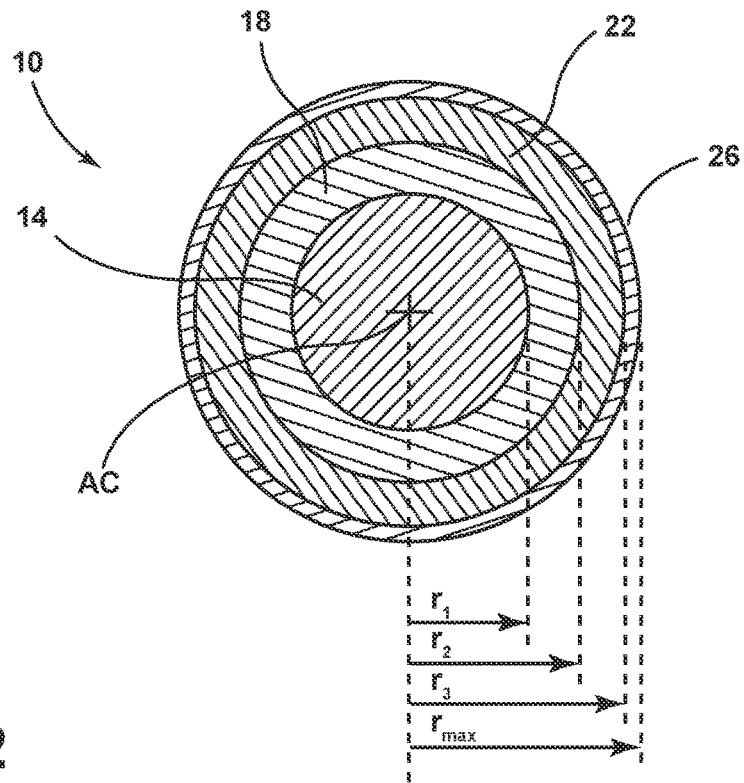
FIG. 2 is a cross-sectional view of the optical fiber taken along the line II-II of FIG. 1 according to one embodiment of the present disclosure.

Referring now to FIG. 2, a cross-sectional view of the optical fiber 10 shown in FIG. 1 is provided. The optical fiber 10 includes the optical waveguide 14 having a radius $r_1$ surrounded and/or coupled to the cured primary coating layer 18 having a radius $r_2$. The cured secondary coating layer 22 has a radius $r_3$ and is positioned around the cured primary coating layer 18. The cured tertiary ink coating layer 26 has a radius $r_{max}$ and provides the outermost surface of the optical fiber 10 by covering and surrounding the cured secondary coating layer 22. Depending on the desired application or properties for the optical fiber 10, the radius $r_1$ of the optical waveguide 14 can be 62.5 microns or can range from 40 microns to 70 microns, the radius $r_2$ of the cured primary coating layer 18 can range from 75 microns to 100 microns, the radius $r_3$ of the cured secondary coating layer 22 can range from 80 microns to 120 microns, and the radius $r_{max}$ of the cured tertiary ink coating layer 26 can range from 120 microns to 135 microns.

A first polymer layer 18 or the cured primary coating layer 18 is positioned adjacent the optical waveguide 14 and typically exhibits a low Young's modulus making this layer soft so it can act as an absorbing layer to prevent the transfer of thermal and mechanical stress in the cable to affect the optical waveguide 14. The cured primary coating layer 18 can have a layer thickness from 5 microns to 45 microns. A second polymer layer 22 or the cured secondary coating layer 22 is positioned around the cured primary coating layer 18 and typically exhibits a high Young's modulus to make this layer hard and abrasion resistant. The cured secondary coating layer 22 can have a layer thickness from 5 microns to 40 microns. A third polymer layer 26 or the cured tertiary ink coating layer 26 is typically a thin polymer layer incorporating an ink that is applied on the outside of the optical fiber 10 for identification purposes. The cured tertiary ink coating layer 26 can have a layer thickness from 2 microns to 10 microns. The cured tertiary ink coating layer 26 has a high Young's modulus that additionally contributes to the abrasion and puncture resistance performance of the fiber.

The optical waveguide 14 of the optical fiber 10 may include a core or a core and one or more cladding layers. The one or more cladding layers may include an inner cladding and an outer cladding that may cooperate to form a cladding disposed around the core. The core may be composed of pure silica, doped silica (e.g., doped with germanium, aluminum, and/or chlorine) and/or other optically transparent materials. The one or more cladding layers may be composed of pure silica, doped silica (e.g., fluorine and/or boron) or other optically transparent materials. The optical fiber 10 may be a single mode fiber or may be a multi-mode fiber. The core may have a higher refractive index than the one or more cladding layers. The core may have a relative refractive index change, or delta, relative to the one or more cladding layers in the range of about 0.2% to about 3.0%, for example about 0.34%, about 0.5%, about 1.0%, about 1.5%, about 2.0%, about 2.5% or about 3.0%. The cladding may be a composite (e.g., inner cladding is composed of glass and the outer cladding is composed of a glass or polymer). The refractive indexes of the materials of the one or more cladding layers may have a lower refractive index than the core. It will be understood that the optical fiber 10, as described herein, may simply be a connection or connector to another longer or larger optical fiber.

The shape and dimensions of the core may be developed in the preform stage of the optical fiber 10, and the core of the preform may have specific geometries applied to maintain the core surfaces of the core during production of the optical fiber 10. The core may have a diameter, largest straight line dimension, or width of the cross-section of about 6 μm, about 7 μm, about 8 μm, about 9 μm, about 10 about 11 μm, about 12 about 13 μm, about 14 μm or about 50 μm. The diameter of the core may be large enough such that the mode field diameter of the core is approximately that of a single mode fiber. The diameter of the core may also be configured for specific design purposes to have a large or small mode field diameter. The diameter of the optical waveguide 14 may be greater than about 80 μm, greater than about 100 μm, greater than about 110 μm, greater than about 120 μm, greater than about 130 μm, or greater than about 140 μm. In some specific embodiments, the diameter of the optical waveguide 14 may be about 125 μm.

The cured primary coating layer 18 of the optical fiber 10 may have a low Young's modulus giving the material a relatively softer feel. The cured primary coating layer 18 can act as an absorbing layer and may prevent the transfer of thermal and mechanical stresses induced to the optical waveguide 14. The cured primary coating layer 18 may be formed from a variety of different UV curable monomer systems such as acrylates to produce polymer layers having a low modulus at room temperature. In some embodiments, the Young's modulus of the cured primary coating layer 18 may be less than about 5.0 MPa at room temperature, less than about 2.0 MPa at room temperature, less than about 1.5 MPa at room temperature, less than about 1.0 MPa at room temperature, or less than about 0.5 MPa at room temperature. The final material properties of the cured primary coating layer 18 can be varied based on the monomer system used, the amount of cure, and/or the reaction conditions such as temperature.

The cured secondary coating layer 22 of the optical fiber 10 may have a higher Young's modulus wherein the cured secondary coating layer 22 is relatively hard and abrasion resistant compared to the cured primary coating layer 18. The cured secondary coating layer 22 can additionally act to prevent the transfer of thermal and mechanical stresses induced to the optical waveguide 14. In some embodiments, the Young's modulus of the cured secondary coating layer 22 may be greater than about 250 MPa at room temperature, greater than about 500 MPa at room temperature, greater than about 750 MPa at room temperature, greater than about 1000 MPa at room temperature, greater than about 1250 MPa at room temperature, or greater than about 1500 MPa at room temperature. The cured secondary coating layer 22 includes a secondary coating glass transition temperature ($T_{g-sec}$). The secondary coating glass transition temperature ($T_{g-sec}$) describes the temperature at which a reversible transition occurs in amorphous materials (or in amorphous regions within semicrystalline materials) where the material goes from a hard and relatively brittle "glassy" state to a viscous or rubbery state as the temperature is increased. In some embodiments, the secondary coating glass transition temperature ($T_{g-sec}$), is greater than or equal to 55° C. In other embodiments, the secondary coating glass transition temperature ($T_{g-sec}$) is greater than or equal to 65° C., is greater than or equal to 75° C., is greater than or equal to 85° C., is greater than or equal to 100° C., is less than or equal to 120° C., or is less than or equal to 110° C.

The cured tertiary ink coating layer 26 or the cured ink layer 26 is the outermost layer of the optical fiber 10 and can be applied to the cured secondary coating layer 22 for identification purposes and/or additional protection for the optical waveguide 14. The cured tertiary ink coating layer 26 can additionally have a high Young's modulus so it can contribute to the abrasion and/or puncture resistance of the optical fiber 10. In some embodiments, the Young's modulus of the cured tertiary ink coating layer 26 may be greater than about 500 MPa at room temperature, greater than about 750 MPa at room temperature, greater than about 1000 MPa at room temperature, greater than about 1250 MPa at room temperature, greater than about 1500 MPa at room temperature, greater than about 1750 MPa at room temperature, or greater than about 2000 MPa at room temperature. The cured tertiary ink coating layer 26 includes an ink coating glass transition temperature ($T_{g-ink}$). The ink coating glass transition temperature ($T_{g-ink}$) describes the temperature at which a reversible transition occurs in amorphous materials (or in amorphous regions within semicrystalline materials) where the material goes from a hard and relatively brittle "glassy" state to a viscous or rubbery state as the temperature is increased. In some embodiments, the ink coating glass transition temperature ($T_{g-ink}$) is greater than or equal to 65° C., is greater than or equal to 75° C., is greater than or equal to 85° C., is greater than or equal to 95° C., is greater than or equal to 105° C., is less than or equal to 120° C., is less than or equal to 110° C., or is less than or equal to 100° C. In other embodiments, the ink coating glass transition temperature ($T_{g-ink}$) may be greater than or equal to 65° C. but less than or equal to 120° C., may be greater than or equal to 75° C. but less than or equal to 120° C., may be greater than or equal to 85° C. but less than or equal to 120° C., may be greater than or equal to 95° C. but less than or equal to 120° C., or may be greater than or equal to 105° C. but less than or equal to 120° C.

As explained below, in FIGS. 3-7, and in the Examples, applying and curing a tertiary ink coating material 56 at a higher temperature can yield a more efficient and complete curing reaction giving a higher $T_{g-ink}$. Selectively choosing and using the exothermic heats of cure reaction ($-\Delta H_{rxn}$) affect the $T_{g-ink}$ and the corresponding material properties of the primary and secondary materials 48, 56 being cured to form the cured primary coating layer 18 and the cured secondary coating layer 22.

The tertiary ink coating layer 26 is applied surrounding the cured secondary coating layer 22 and separately cured. The tertiary ink coating layer 26 is applied such that the cured secondary coating layer 22 enters an ink layer applicator device 54 at a desired warm temperature ($T_{sec}$). The term $T_{sec}$, as used herein, is defined to mean the surface temperature of the cured secondary coating layer 22 as it enters an ink layer applicator device 54. During the curing of the ink layer, the ink coating monomer system 56 is polymerized and there is an increase in the ink layer temperature because of the exothermic heat of the curing reaction. In some embodiments, the temperature of the secondary coating layer ($T_{sec}$) entering the ink layer applicator (third curing device 58) (or during application of the ink coating material) is less than or equal to the $T_{g-ink}+40°$ C., wherein the $T_{g-ink}$ is the cured ink coating layer glass transition temperature, as described above. In some embodiments, when the ink monomer system is cured during the draw process on the optical fiber 10 having the predisposed cured primary and secondary coating layers 18, 22, temperature of the secondary coating layer ($T_{sec}$) entering the ink layer applicator (third curing device 58) (or during application of the ink coating material) is less than or equal to the $T_{g-ink}+20°$ C., less than or equal to the $T_{g-ink}+10°$ C., less than or equal to the $T_{g-ink}+5°$ C., less than or equal to the $T_{g-ink}$. In some embodiments, the temperature of the cured secondary coating layer temperature ($T_{sec}$) for the cured tertiary ink coating layer 26 is less than the $T_{g-ink}$. In still other embodiments, the temperature of the secondary coating layer ($T_{sec}$) entering the third curing device 58 (ink layer applicator) (or during application of the ink coating material) is greater than or equal to the $T_{g-ink}-25°$ C., greater than or equal to the $T_{g-ink}-15°$ C., greater than or equal to the $T_{g-ink}-5°$ C., greater than or equal to the $T_{g-ink}+5°$ C., greater than or equal to the $T_{g-ink}+10°$ C., or greater than or equal to the $T_{g-ink}+15°$ C. By carefully selecting the secondary coating layer temperature ($T_{sec}$) entering the third curing device 58 (ink layer applicator) (or during application of the ink coating material), the cured ink coating layer 26 can be designed to exhibit low fiber wind defects, a desired ink coating glass transition temperature ($T_{g-ink}$), and good fiber adhesion performance in ribbon cables.

The layer of primary coating material 18 is formed from a soft, crosslinked polymer material having a low Young's modulus (e.g., less than about 5 MPa at 25° C.) and a low glass transition temperature ($T_g$) (e.g., less than about −10° C.). The layer of primary coating material 18 desirably has a higher refractive index than the cladding of the optical fiber in order to allow it to strip errant optical signals away from the optical fiber cladding. The layer of primary coating material 18 should maintain adequate adhesion to the glass fiber during thermal and hydrolytic aging, yet be strippable therefrom for splicing purposes. The layer of primary coating material 18 typically has a thickness in the range of 25-40 µm (e.g., about 32.5 µm). Primary coatings are typically applied to the glass fiber as a liquid and cured, as will be described in more detail hereinbelow. Conventional curable compositions used to form primary coatings are formulated using an oligomer (e.g., a polyether urethane acrylate), one or more monomer diluents (e.g., ether-containing acrylates), a photoinitiator, and other desirable additives (e.g., antioxidant). Primary coatings for optical fibers have been well-described in the past, and are familiar to the skilled artisan. Desirable primary coatings are disclosed in U.S. Pat. No. 7,923,483 to Chien et al., U.S. Pat. No. 6,326,416 to Chien et al., U.S. Pat. No. 6,531,522 to Winningham, U.S. Pat. No. 6,539,152 to Fewkes et al., U.S. Pat. No. 6,849,333 to Schissel et al., U.S. Pat. No. 6,563,996 to Winningham, and U.S. Pat. No. 6,869,981 to Fewkes et al.; and U.S. Patent Application Publ. No. 20030123839 to Chou et al., each of which is incorporated herein by reference in its entirety.

Although the layer secondary coating material 22 is usually applied directly to the primary coating, the skilled artisan will recognize that there may be one or more intermediate coating layers deposited between the primary coating and the secondary coating. The secondary coating is formed from a cured polymeric material, and typically has a thickness in the range of 20-35 µm (e.g., about 27.5 µm). The layer of secondary coating material 22 desirably has sufficient stiffness to protect the optical fiber; is flexible enough to be handled, bent, or spooled; has low tackiness to enable handling and prevent adjacent convolutions on a spool from sticking to one another; is resistant to water and chemicals such as optical fiber cable filling compound; and has adequate adhesion to the coating to which it is applied (e.g., the primary coating).

The cured polymeric materials used in the layer of secondary coating material 22 of the optical fibers may be the cured product of a curable composition including an oligomer and at least one monomer. As is conventional, the curable compositions used in forming the layer of secondary coating material 22 may also include photoinitiators, antioxidants, and other additives familiar to the skilled artisan. In desirable embodiments of the invention, the oligomer and monomers of the curable composition are ethylenically unsaturated and contain (meth)acrylate functional groups to facilitate curing. The oligomer may be, for example, a urethane (meth)acrylate oligomer. However, as the skilled artisan will recognize, oligomers and monomers adapted for other curing chemistries, such as epoxy, vinyl ether, and thiolene, may be used in accordance with the present invention. Suitable functional groups for ethylenically unsaturated monomers used in accordance with the present invention include, without limitation, acrylates, methacrylates, acrylamides, N-vinyl amides, styrenes, vinyl ethers, vinyl esters, acid esters, and combinations thereof (i.e., for polyfunctional monomers). Specific monomers and oligomers that can be used to make the layer of secondary coating material 22 are disclosed in U.S. Pat. No. 7,923,483 to Chien et al., which is incorporated herein by reference in its entirety.

Most suitable monomers are either commercially available or readily synthesized using reaction schemes known in the art. For example, most of the above-listed monofunctional monomers can be synthesized by reacting an appropriate alcohol or amine with an acrylic acid or acryloyl chloride. The oligomeric component can include a single type of oligomer or it can be a combination of two or more oligomers. When employed, if at all, the oligomeric component introduced into the compositions of the present invention preferably comprises ethylenically unsaturated oligomers. While the oligomeric component can be present in an amount of 15 weight percent or less, it is preferably present in an amount of about 13 weight percent or less, more preferably about 10 weight percent or less, even more preferably less than about 10 percent, and most preferably about 9 percent of less. While maintaining suitable physical characteristics of the composition and its resulting cured material, it is more cost-effective and, therefore, desirable to prepare compositions containing preferably less than about 5 weight percent or substantially devoid of the oligomeric component.

The ink coating material 56 can be formed by adding pigments and/or dyes to a pigment binder phase (i.e., a curable secondary coating composition containing oligomer(s) and monomer(s) and co-monomers). The co-monomer components are preferably polar, non acrylate monomers (e.g., N-vinyl caprolactam monomer).

The ink coating materials 56 include a pigment binder phase, a pigment or dye, and a phosphine oxide photoinitiator, wherein the ink formulation is characterized by a cure speed of at least about 80 percent acrylate conversion/second, more preferably between about 80 and about 500 percent acrylate conversion/second, or between about 100 and about 400 percent acrylate conversion/second. Cure speed is a measure of the percent of acrylate conversion per second (percent/s). The percentage of cure was evaluated in accordance with the Fourier Transform Infrared Spectroscopy analyses. Basically, an uncured film is applied to an ASI DuraSamplir® ATR crystal (or equivalent) at ~1 mm thickness, the film is purged with nitrogen for 30 sec, and then irradiated to induce polymerization with, e.g., Lesco Mark II Spot cure unit and UniBlitz® VS25 Shutter Assembly with model T132 driver. The shutter is opened for a 1 sec exposure, and spectra are collected at 6 ms intervals for 0.9 sec. Following the 0.1 sec pause, spectra are again collected for 5 sec following initial exposure. The shutter again opens for a 10 sec exposure, which allows for calculation of the 100% cure band ratio. Both uncured and fully cured band ratio are calculated for each, and a cure vs. time plot is constructed using conventional software, e.g., OPUS v3.04 in OS/2 (Spectrometer operation and data manipulation), Galactic Grams32 v5.02, and MicroCal Origin v6.0. The polymerization rate, Rp, can be calculated at any point in the curve from the slope of the curve, and the maximum polymerization rate is preferably estimated as the slope of the curve from 10% conversion to 40% conversion. The reported cure speed number is the slope of the line within this range.

Coloring agents, as used herein, may be selected from a variety of pigments and/or dyes. In some embodiments, the pigments or dyes are not greater than about 1 micron. Exemplary pigments and dyes (and the respective colors thereof) include, without limitation: titanium dioxide, which is a white pigment; phthalocyanine blue and indanthrone blue, which are blue pigments; azo yellow, diarylide yellow, and isoindolinone yellow, which are yellow pigments; phthalocyanine green, which is a green pigment; azo red, naphthol red, and perylene red, which are red pigments; carbon blacks, which are black pigments; pyrazolone orange, which is an orange pigment; and carbazole and quinacridone violet, which are violet pigments; The remaining colors of brown, slate, aqua and rose can be made using the appropriate combinations of the above listed pigments. Other pigments are known and others are continually being developed so that they have cure speeds within the above-noted ranges and preferences in the preceding paragraphs.

The initiation, propagation, and termination reactions for a free-radical polymerization (curing) process are as follows:

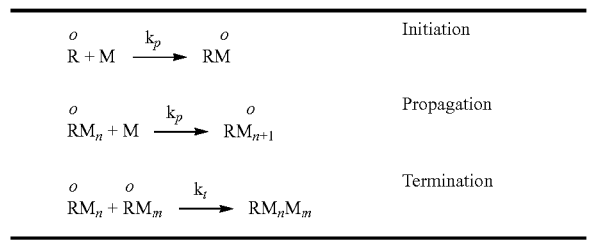

where the dot over the reacting species represents a free radical, i.e., an unpaired electron. The speeds of these reactions are limited not by the rate constants but by the time required for the reacting species to find each other and build the reaction complexes (diffusion-limited reaction). The diffusion limit is quickly reached because as the reaction of the ink matrix progresses, the number of crosslinks and the average molecular weight increase, causing the molecules to become less mobile and the respective glass transition temperature ($T_g$) to increase. When the glass transition temperature ($T_g$) increases to a temperature comparable to the reaction temperature, the rate of reaction decreases significantly because the reacting species can no longer migrate to each other. At room temperature for typical ink coating materials, the diffusion limit is reached and the reaction essentially stops before full conversion (curing) can be achieved and the average degree of cure of the cured ink layer does not usually exceed 90%. At higher curing temperatures, e.g. 75° C. and above, however, onset of the diffusion-limited regime is delayed, the reacting species remain mobile for longer times, and the degree of cure increases. Average degree of cure from the on-draw process is normally above 93% and can exceed 98%. At the same time, the dose required to achieve the high conversion (cure) levels is typically 20% lower when curing at 75° C. or higher, which reduces the amount of space that must be dedicated to UV lamps.

In some embodiments, it is advantageous to apply the tertiary ink coating material 56 immediately after the cured primary and secondary coating layers 18, 22 are formed, that is, as the fiber is drawn. The curing of the respective monomer systems to form the cured primary and secondary coating layers 18, 22 is an exothermic reaction, thus the temperature of the freshly cured primary and secondary coating layers 18, 22 remains elevated for a finite period of time after curing because of the heat ($-\Delta H_{rxn}$) released in the exothermic curing reactions of the cured primary and secondary coating layers 18, 22. For example, in an embodiment where the reaction enthalpy ($\Delta H_{rxn}$) is −75 Joules/gram (J/g) for the polymerization and curing of the primary coating layer 18 and the reaction enthalpy is −100 J/g for the polymerization and curing of the secondary coating layer 22, the heat produced would be sufficient to heat a glass waveguide with a diameter of 125 microns by 30° C. (e.g. from 50° C. to 80° C.) after coating and curing, assuming typical outer diameters of 190 microns for the primary coating layer 18 and 242 microns for the secondary coating layer 22. In such embodiments, the heat generated from the curing of the primary and secondary coating layers 18, 22 provides a coating surface with an increased temperature to apply and form the cured tertiary ink coating layer 26. The glass waveguide and each layer 18, 22 has a respective heat capacity that can be accounted for and it is understood that the composite layers 18, 22 do not reach thermal equilibrium instantaneously but is ideally at their highest respective temperatures when the ink coating material 56 is applied and cured to form the cured tertiary ink coating layer 26.

By convention and as used herein, heat of reaction for an exothermic reaction is a negative quantity and is expressed herein as $\Delta H_{rxn}$. The heat released to the surroundings from an exothermic reaction corresponds to the negative of the heat of reaction; that is $-\Delta H_{rxn}$. The more negative the heat of reaction is (that is, the lower the heat of reaction is), the greater is the amount of heat released from an exothermic reaction. As noted above, heat released from an exothermic reaction provides energy for heating the optical waveguide and/or any of the surrounding coating materials or cured coating layers. The heat of reaction is also referred to herein as the enthalpy of reaction.

The polymerization and curing enthalpies for the respective monomer, oligomer, and/or polymer systems in the primary and secondary coating materials 40 and 48 used to make the cured primary and secondary coating layers 18, 22 are selected to provide the desired heats of reaction ($\Delta H_{rxn}$) needed to sufficiently heat the partially coated optical fiber before application of the tertiary ink coating material 56. In some aspects, the heat of reaction ($\Delta H_{rxn}$) of the primary coating material 40 used to form the cured primary coating layer 18 is less than about −70 J/g, less than about −80 J/g, less than about −90 J/g, less than about −100 J/g, less than about −110 J/g, less than about −125 J/g, less than about −150 J/g, less than about −175 J/g, less than about −200 J/g, or less than about −225 J/g.

In some aspects, the heat of reaction ($\Delta H_{rxn}$) of the secondary coating material 48 used to form the cured secondary coating layer 22 is less than about −70 J/g, less than about −80 J/g, less than about −90 J/g, less than about −100 J/g, less than about −110 J/g, less than about −125 J/g, less than about −150 J/g, less than about −175 J/g, less than about −200 J/g, or less than about −225 J/g.

In some aspects, the heat of reaction ($\Delta H_{rxn}$) of the ink coating material 56 used to form the cured ink coating layer 26 is less than about −70 J/g, less than about −80 J/g, less than about −90 J/g, less than about −100 J/g, less than about −110 J/g, less than about −125 J/g, less than about −150 J/g, less than about −175 J/g, less than about −200 J/g, or less than about −225 J/g.

Figure 3:
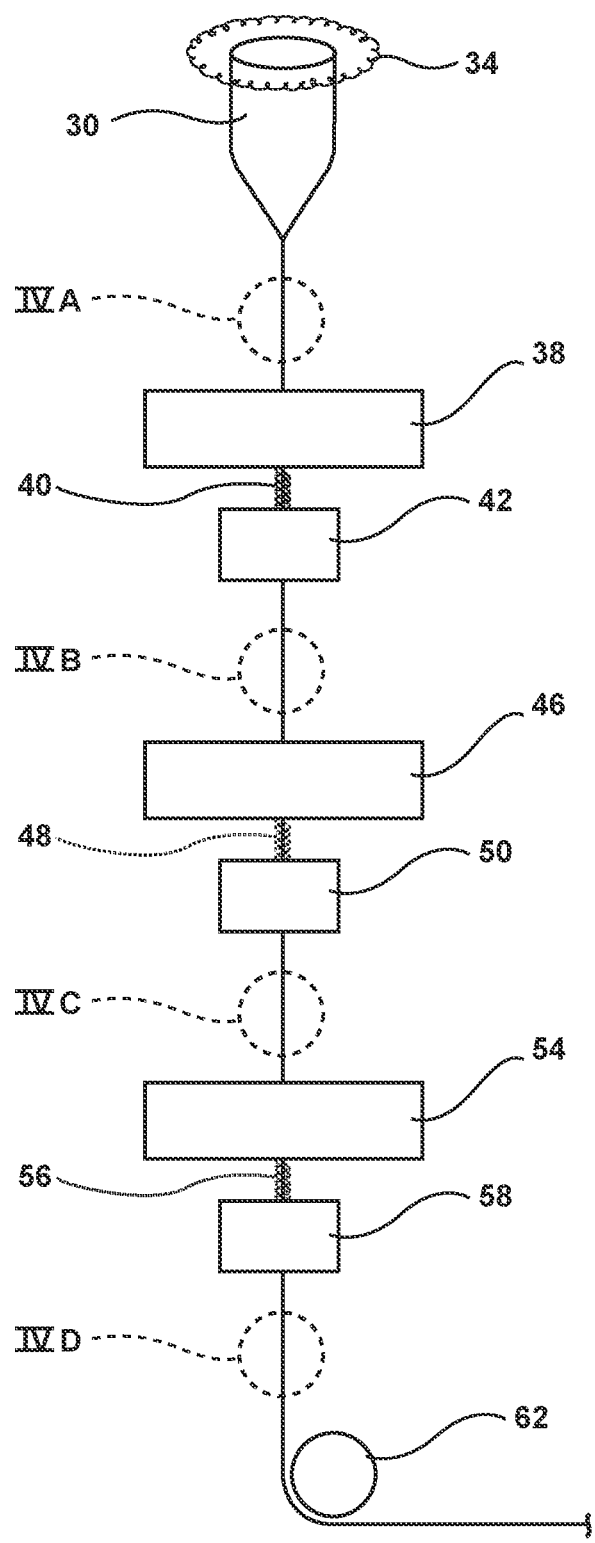
FIG. 3 is a schematic view of a drawing tower used to manufacture an optical fiber according to one embodiment according to the present invention.

Referring now to FIG. 3, a schematic view of a drawing tower is provided to outline the general process conditions for application and curing of the primary, secondary, and tertiary ink coating layers 18, 22, 26. The application of the cured tertiary ink coating layer 26 during the drawing process results in cured tertiary ink coating layer 26 properties that are different from the corresponding properties of an ink layer applied separately in an off-line process. Some of the process and cure parameters that can contribute to the material property differences in the cured tertiary ink coating layer 26 include: the fiber's temperature at which the ink coating material 56 is applied, the curing intensity and time of the exposure of tertiary ink coating material 56 to the curing radiation. The properties of the tertiary ink coating material 56 as applied and cured during the draw can impact the fiber performance characteristics such as wind defects, adhesion performance when used in ribbons, etc.

A glass preform 30 is heated in a furnace 34 to draw the optical waveguide 14 containing the core and one or more cladding layers. The glass preform 30 is drawn into the optical waveguide 14 by a tractor 62 where the diameter of the waveguide 14 is measured by a first measuring device that can make adjustments to the diameter by manipulating the speed and/or tension of the tractor 62. The cross-section of the optical waveguide 14 at position IV A in FIG. 3 is provided in FIG. 4A.

The optical waveguide 14 is then passed through a first applicator device 38 where an applicator dye is adapted to apply a desired amount of primary coating material 40 onto the optical waveguide 14. In some aspects, the primary coating material 40 is applied as a viscous resin in the first applicator device 38. The optical waveguide 14 coated with the primary coating material 40 is then passed through a first curing device 42. The first curing device 42 includes one or more curing lamps (e.g. UV curing lamps) or light emitting diodes (LEDs) (e.g. UV LEDs) that are adapted to effect the curing of the primary coating material 40. The degree and kinetics of the cure are at least partially controlled by the power irradiated with the one or more curing lamps or LEDs and/or the fiber drawing speed. The cross-section of the optical waveguide 14 coated with the cured primary coating layer 18, corresponding to position IV B in FIG. 3, is provided in FIG. 4B.

The optical waveguide 14 and cured primary coating layer 18 are then passed through a second applicator device 46 where a second applicator dye is adapted to apply a desired amount of secondary coating material 48 onto the cured primary coating layer 18. In some aspects, the secondary coating material 48 is applied as a second viscous resin in the second applicator device 46. The optical waveguide 14 coated with the cured primary coating layer 18 and secondary coating material 48 are then passed through a second curing device 50. The second curing device 50 may include one or more curing lamps (e.g., UV curing lamps) or LEDs (e.g. UV LEDs) that are adapted to effect the curing of the secondary coating material 48. The degree and kinetics of the cure are at least partially controlled by the power irradiated with the one or more curing lamps or LEDs, and/or the fiber drawing speed. The cross-section of the optical waveguide 14 coated with the cured primary coating layer 18 and the cured secondary coating layer 22, corresponding to position IV C in FIG. 3, is provided in FIG. 4C.

The optical waveguide 14 having cured primary coating layer 18 and cured secondary coating layer 22 is then passed through a third applicator device 54 or ink application device 54 where a third applicator dye is adapted to apply a desired amount of tertiary ink coating material 56 onto the cured secondary coating layer 22. In some aspects, the tertiary ink coating material 56 is applied as a third viscous resin in the third applicator device 54. The optical waveguide 14 coated with the cured primary and secondary coating layers 18, 22, and tertiary ink coating material 56 is then passed through a third curing device 58. The third curing device 58 may include one or more curing lamps (e.g. UV curing lamps) or LEDs (e.g. UV LEDs) that are adapted to effect the curing of the tertiary ink coating material 56. The degree and kinetics of the cure are at least partially controlled by the power irradiated with the one or more curing lamps or LEDs, and/or the fiber drawing speed. The cross-section of the optical waveguide 14 coated with the cured primary coating layer 18, the cured secondary coating layer 22, and the cured tertiary ink coating layer 26, corresponding to position IV D in FIG. 3, is provided in FIG. 4D.

Figure 5:
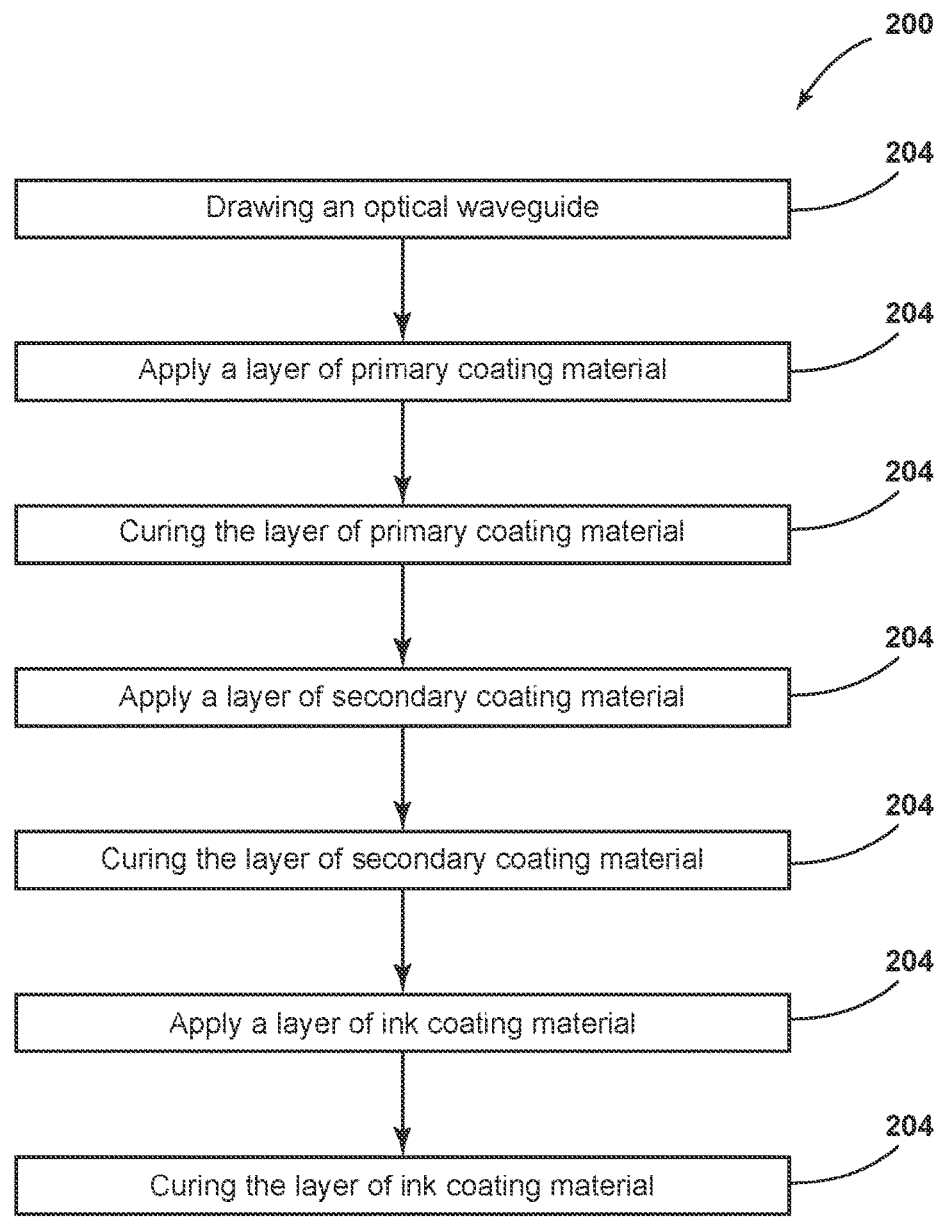
FIG. 5 is a schematic flow diagram illustrating a method for manufacturing an optical fiber.

Referring now to FIG. 5, with continued reference to FIGS. 1-4D, an embodiment of a method 200 for manufacturing the optical fiber 10 is provided. The method 200 begins with a step 204 that includes drawing the optical waveguide 14. The glass preform 30 is heated in the furnace 34 to draw the optical waveguide 14 containing the core and one or more cladding layers.

Next is a step 208 of applying the primary coating material 40 to surround and/or cover the optical waveguide 14. The optical waveguide 14 is passed through the first applicator device 38 where the applicator dye applies a desired amount of primary coating material 40 onto the optical waveguide 14.

Next is a step 212 of curing primary coating material 40 to form cured primary coating layer 18. The first curing device 42 includes one or more curing lamps (e.g. UV curing lamps) or LEDs (e.g., UV LEDs) that are adapted to effect the curing of the primary coating material 40. The degree and kinetics of the cure are at least partially controlled by the power irradiated with the one or more curing lamps or LEDs, and/or the fiber drawing speed. The polymerization and curing enthalpies for the respective monomer, oligomer, and/or polymer systems used as the primary coating material 40 to make the cured primary coating layer 18 are selected to provide the desired heats of reaction ($-\Delta H_{rxn}$) to heat the optical waveguide 14 and cured primary coating layer 18 to a desired temperature before application of the secondary coating material 48 and/or tertiary ink coating material 56.

Next is a step 216 of applying the secondary coating material 48 to surround and/or cover the cured primary coating layer 18. The optical waveguide 14 having the primary coating layer 18 is passed through the second applicator device 46 where the applicator dye applies a desired amount of secondary coating material 48 onto the cured primary coating layer 18.

Next is a step 220 of curing the secondary coating material 48 to form the cured secondary coating layer 22. The second curing device 50 may include one or more curing lamps (e.g. UV curing lamps) or LEDs (e.g. UV LEDs) that are adapted to effect the curing of the secondary coating material 48. The degree and kinetics of the cure are at least partially controlled by the power irradiated with the one or more curing lamps or LEDs, and/or the fiber drawing speed. The polymerization and curing enthalpies for the respective monomer, oligomer, and/or polymer systems used as the secondary coating material 48 to make the cured secondary coating layer 22 are selected to provide the desired heats of reaction ($-\Delta H_{rxn}$) to heat optical waveguide 14, cured primary coating layer 18 and cured secondary coating layer 22 to a desired temperature before application of the tertiary ink coating material 56.

Next is a step 224 of applying the layer of tertiary ink coating material 56 to surround and/or cover the cured secondary coating layer 22. The optical waveguide 14 having the cured primary and secondary coating layers 18, 22 is passed through the third applicator device 54 where the applicator dye applies a desired amount of tertiary ink coating material 56 onto the cured secondary coating layer 22.

Next is a step 228 of curing the tertiary ink coating material 56 to form the cured tertiary ink coating layer 26. The third curing device 58 may include one or more curing lamps (e.g. UV curing lamps) or LEDs (e.g. UV LEDs) that are adapted to effect the curing of the tertiary ink coating material 56. The degree and kinetics of the cure is at least partially controlled by the power irradiated with the one or more curing lamps or LEDs, and/or the fiber drawing speed. The polymerization and curing enthalpies for the respective monomer, oligomer, and/or polymer systems used as the tertiary ink coating material 56 to make the cured tertiary ink coating layer 26 are selected to provide the desired heats of reaction ($-\Delta H_{rxn}$) to heat the tertiary ink coating material 56 to a desired temperature during formation of the cured tertiary ink coating layer 26.

The wavelength of curing radiation of the primary coating material, secondary coating material, and tertiary ink coating material is infrared, visible, or ultraviolet. Representative wavelengths include wavelengths in the range from 250 nm-1000 nm, or in the range from 250 nm-700 nm, or in the range from 250 nm-450 nm, or in the range from 275 nm-425 nm, or in the range from 300 nm-400 nm, or in the range from 320 nm-390 nm, or in the range from 330 nm-380 nm, or in the range from 340 nm-370 nm. Curing can be accomplished with light sources that include a lamp source (e.g. Hg lamp), an LED source (e.g. a UVLED, visible LED, or infrared LED), or a laser source.

In a continuous optical fiber manufacturing process, a glass fiber is drawn from a heated preform and sized to a target diameter (typically 125 mm). The glass fiber is then cooled and directed to a coating system that applies a liquid primary coating composition to the glass fiber. Two process options are viable after application of the liquid primary coating composition to the glass fiber. In one process option (wet-on-dry process), the liquid primary coating composition is cured to form a solidified primary coating, the liquid secondary coating composition is applied to the cured primary coating, and the liquid secondary coating composition is cured to form a solidified secondary coating. In a second process option (wet-on-wet process), the liquid secondary coating composition is applied to the liquid primary coating composition, and both liquid coating compositions are cured simultaneously to provide solidified primary and secondary coatings. After the fiber exits the coating system, the fiber is collected and stored at room temperature. Collection of the fiber typically entails winding the fiber on a spool and storing the spool.

The primary coating material, secondary coating material, and tertiary ink coating material can be applied and cured in a common continuous manufacturing process. Alternatively, the primary coating material and secondary coating material are applied and cured in a common continuous manufacturing process, the coated fiber is collected, and the tertiary ink coating material is applied and cured in a separate offline process to form the tertiary ink coating layer.

Each of the primary coating material, secondary coating material, and tertiary ink coating material are curable with any of the wavelengths and any of the light sources referred to above. The same wavelength or source can be used to cure each of the primary coating material, secondary coating material, and tertiary ink coating material, or different wavelengths and/or different sources can be used to cure the primary coating material, secondary coating material, and tertiary ink coating material. Curing of the primary coating material, secondary coating material, and tertiary ink coating material can be accomplished with a single wavelength or a combination of two or more wavelengths.

It is understood that the descriptions outlining and teaching the optical fiber 10 previously discussed, which can be used in any combination, apply equally well to the method 200 for manufacturing the optical fiber 10.

Use of the present embodiments and disclosure herein may offer several advantages over existing techniques for manufacturing optical fibers 10 or the techniques used to add a tertiary ink layer to the optical fiber 10. First, it offers an efficient, high performance cured tertiary ink layer 26 formed during the draw. Second, wind defects or deformation of the cured secondary coating layer 22 can be lowered when wound hot from the curing process performed during the draw. Third, it provides good fiber adhesion/pullout performance in ribbon cables. Fourth, the faster reaction rate at elevated temperatures means fewer UV lamps are required at a particular draw speed to cure the tertiary ink coating material 56 and consequently, the optical fiber 10 may be drawn at faster speeds on a draw tower of a given height. Fifth, the physical properties of the cured tertiary ink coating layer 26, especially the increased ink glass transition layer ($T_{g\text{-}ink}$), result in improved handling characteristics such as slickness and higher degree of cure for the cured tertiary ink coating layer 26. Lastly, the tertiary ink coating material 56 may be less susceptible to inhibition from oxygen in the surrounding environment as the reaction rate of curing at elevated temperatures (e.g. above 75° C.) becomes accelerated relative to the rate of oxygen diffusion.

Reference will now be made in detail to the present representative embodiments, examples of which are illustrated in the accompanying drawings. Whenever possible, the same reference numerals will be used throughout the drawings to refer to the same or like parts.

EXAMPLES

Materials and Methods

Properties of cured ink coating layers in the form of thin films and on fiber samples are described. The cured ink coating layers were made from red and blue ink coating materials. The compositions of the ink coating materials are listed in Table 1. Amounts are shown as weight percent (wt %).

TABLE 1

| Component | Blue | Red |
|---|---|---|
| Miramer PE210 | 30 | 30 |
| Miramer M240 | 49.6 | 52.09 |
| NVC | 5 | 5 |
| Firstcure TPO | 3 | 3 |
| Irgacure 184 | 2 | 2 |
| Uvitex OB | 0.1 | 0.1 |
| Irganox 1035 | 0.5 | 0.5 |
| Tegorad 2250 | 3.25 | 3.25 |
| 9W892 (75 wt. % $TiO_2$) | 2.6 | 1.4 |
| 9S1875 (20 wt. % blue pigment) | 7.8 | 0.21 |
| 9R925 (30 wt. % red pigment) | 0 | 6.3 |

Miramer 210 (a monomer) is bisphenol A diacrylate (Miwon Specialty Chemical Co.). Miramer M240 (a monomer) is ethoxylated (4)bisphenol A diacrylate (Miwon Specialty Chemical Co.). NVC (a monomer) is N-vinylcaprolactam (Aldrich). Firstcure TPO (a photoinitiator) is (2,4,6-trimethylbenzoyl)diphenyl phosphine oxide (Albemarle Corp.). Irgacure 184 (a photoinitiator) is 1-hydroxycyclohexyl-phenyl ketone (BASF). Uvitex OB (an optical brightener) is 2,5-thiophenediylbis(5-tert-butyl-1,3-benzoxazole (BASF). Irganox 1035 (an antioxidant) is thiodiethylene bis(3,5-di-tert-butyl)-4-hydroxyhydrocinnamate (BASF), Tegorad 2250 (a slip agent) is a silicone polyether acrylate compound (Evonik Industries). 9W892, 9S1875, and 9R925 are coloring agents with proprietary formulations (Penn Color Inc.).

For the ink coating layers, the in situ modulus was measured using fiber tube-off samples prepared from fiber samples or film samples. A 0.0055 inch miller stripper was clamped down approximately 1 inch from the end of the fiber sample. This one-inch region of fiber sample was immersed into a stream of liquid nitrogen and held for 3 seconds. The fiber sample was then removed and quickly stripped. The stripped end of the fiber sample was then inspected. The samples were run using a Rheometrics DMTA IV instrument at a sample gauge length 11 mm to obtain the in situ modulus of the coating layers. The width, thickness, and length were determined and provided as input to the operating software of the instrument. The sample was mounted and run using a time sweep program at ambient temperature (21° C.) using the following parameters: Frequency: 1 Rad/sec; Strain: 0.3%; Total Time=120 sec; Time Per Measurement=1 sec; Initial Static Force=15.0 g; Static>Dynamic Force by=10.0%. Once completed, the last five E' (storage modulus) data points were averaged.

Examples 1-3

Table 2 below provides examples of cured ink films having a thickness of about 38 microns using the blue ink coating material. These provided films are applied at temperatures ($T_{film}$) that correspond to temperature experienced by the secondary coating ($T_{sec}$) as it enters the ink applicator at the draw and are then cured at room temperature using different belt speeds. Additionally provided is the ribbon adhesion performance of a fiber blue ink layer having a degree of cure similar to the blue ink film's degree of cure. In the provided fiber examples on which the cured blue ink layers were applied/cured, subsequent evaluation is provided regarding the ribbon adhesion performance. The film temperature ($T_{film}$) in Examples 1-3 was calculated to be about 105° C.

vided regarding the ribbon adhesion performance. The temperature of the cured secondary coating ($T_{sec}$) in Examples 4-7 was calculated to be about 105° C.

TABLE 3A

| Example | Ink Type | Film Thickness of Cured Film (microns) | Intensity (mJ/cm$^2$) | Condition | O$_2$ Level (%) |
|---|---|---|---|---|---|
| 4 | Red | 25 | 500 | Air | 21 |
| 5 | Red | 25 | 500 | Low O$_2$ | 1 |
| 6 | Red | 13 | 500 | Air | 21 |
| 7 | Red | 13 | 500 | Low O$_2$ | 1 |

TABLE 3B

| Example | Temp for Curing [° C.] | Film $T_{g\text{-}ink}$ [° C.] | Ribbon Adhesion Performance of Ink Layer in Fiber Corresponding to Film Ink Layer Degree of Cure |
|---|---|---|---|
| 4 | 23 | 59.4 | Poor |
| 5 | 23 | 59.3 | Poor |
| 6 | 100 | 97.5 | Good |
| 7 | 100 | 95.6 | Good |

Figure 7:
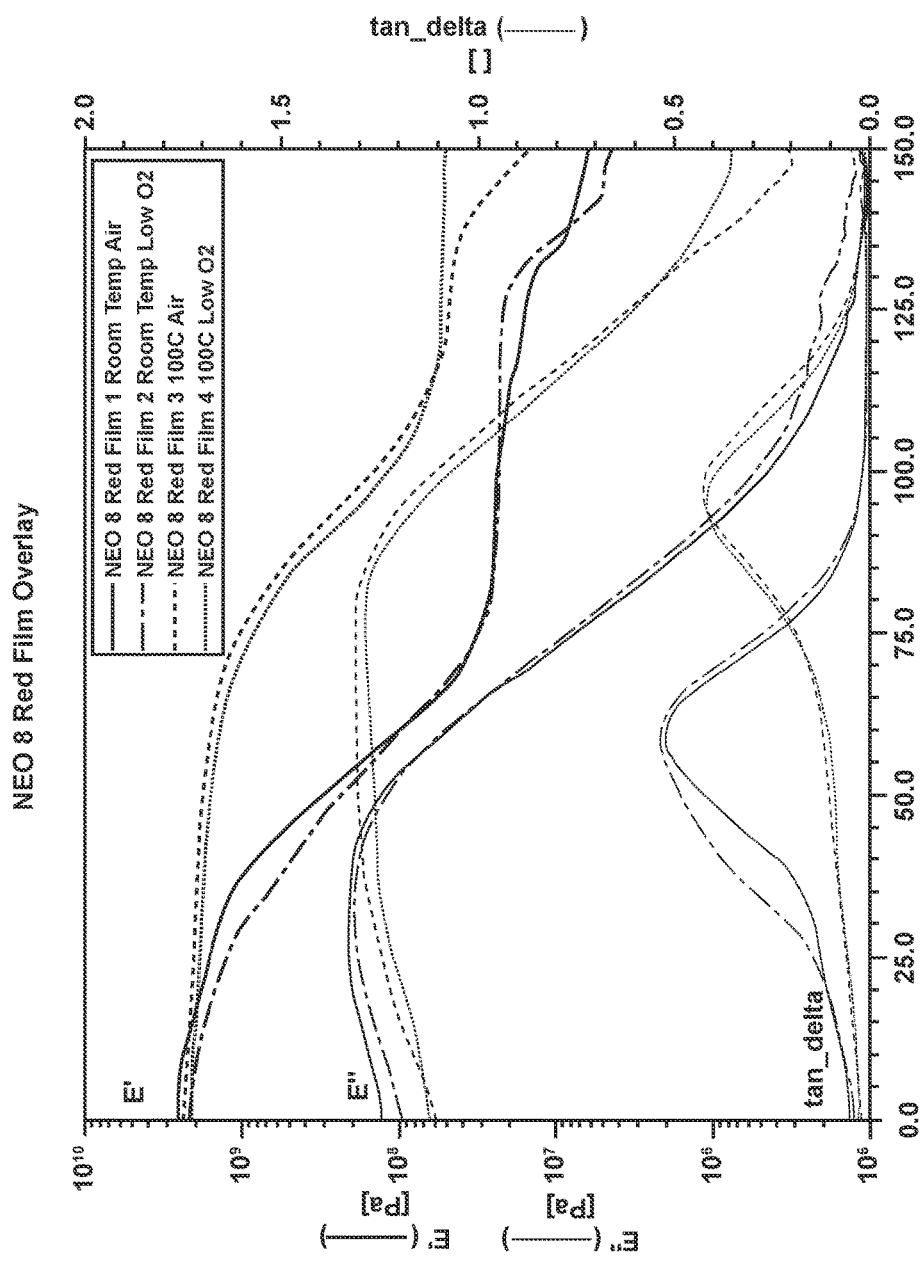
FIG. 7 presents a graph of the Modulus and Tan δ measurements for a tertiary ink coating in Examples 4-7.

Referring now to FIG. 7, the modulus and Tan(δ) measurements are provided for Examples 4-7 listed in Table 2. The peak or maximum temperature value in the Tan(δ) plots corresponds to the glass transition temperature, $T_{g\text{-}ink}$ of the respective cured red ink films. The plot supports the conclusion that curing at higher temperatures under same curing intensity results in films with much higher glass transition temperatures.

Still referring to FIG. 7, the chart plots the storage (E') and loss (E") moduli of the cured red ink films cured in nitrogen

TABLE 2

| Example | Ink Type | Film Thickness of Wet Film (microns) | Intensity (mJ/cm$^2$) | Film Degree of Cure (%) | Ink Film $T_{g\text{-}ink}$ [° C.] | Ribbon Adhesion Performance of Ink Layer in Fiber Corresponding to Film Ink Layer Degree of Cure |
|---|---|---|---|---|---|---|
| 1 | Blue | 38.1 | 254 | 77 | 57.2 | Poor |
| 2 | Blue | 38.1 | 515 | 82 | 61.3 | Poor |
| 3 | Blue | 38.1 | 9460 | 97 | 90.3 | Good |

Figure 6:
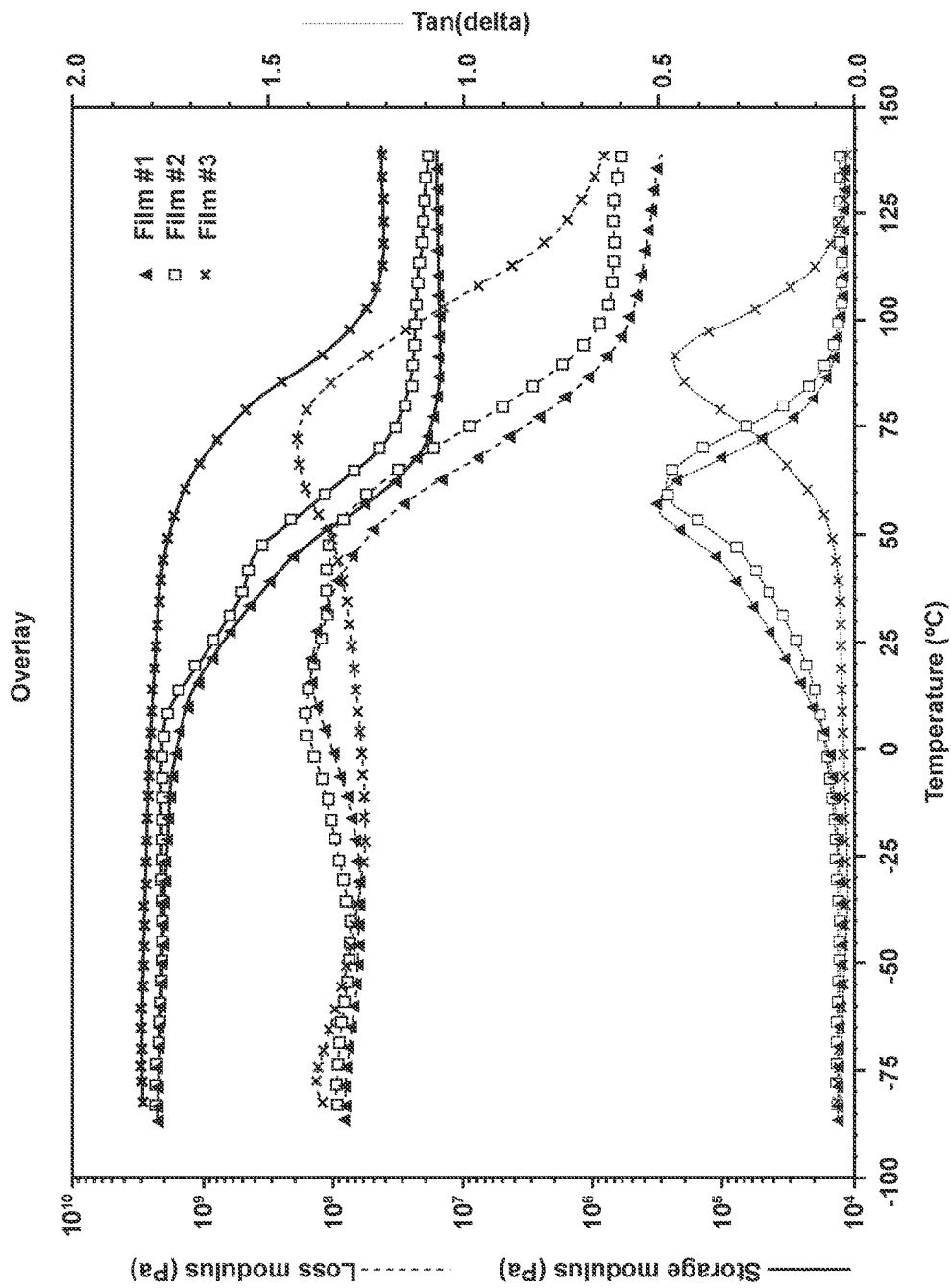
FIG. 6 presents a graph of the Modulus and Tan δ measurements for a tertiary ink coating provided in Examples 1-3.

Referring now to FIG. 6, the modulus and Tan(δ) measurements are provided for Examples 1-3 listed in Table 2. The peak or maximum temperature value in the Tan(δ) plots corresponds to the glass transition temperature, $T_{g\text{-}ink}$ of the respective cured blue ink films.

Examples 4-7

Tables 3A and 3B below provide examples of cured ink films having a thickness of about 38 microns using the red ink coating material. The films were applied at the temperature of the cured secondary coating ($T_{sec}$) and then cured at either room temperature or 100° C. using different belt speeds through the curing apparatus. The respective cured ink film's degree of cure and glass transition temperature ($T_{g\text{-}ink}$) were calculated. Additionally provided is the ribbon adhesion performance of a fiber red ink layer having a degree of cure similar to the red ink film's degree of cure. In the provided fiber examples on which the cured red ink layers were applied/cured, subsequent evaluation is progas (N$_2$) or in air at either room temperature or 100° C. Triplet oxygen, which is present in the atmosphere, is a di-radical molecule since it has two unpaired electrons. Because of its di-radical nature, triplet oxygen can act as a free radical terminator or quencher of the curing reaction since it can react with the free radicals produced by the curing lamps or LEDs in the curing reaction of the ink layer material. The result of triplet oxygen is a delay in the initiation and/or propagation of the free-radical polymerization that occurs during curing and possibly a reduction in the degree of cure. Since there is only a small difference in the properties of the resultant cured red ink films when exposed to air, the oxygen likely only penetrates a few tenths of a micron into the red ink layer material while it reacts (cures). Alternatively, there is a very large change in the red ink film properties when the red ink film reaction (curing) temperature is increased. As provided in Examples 4-7, when the modulus values are measured at 23° C., the storage modulus of the cured red ink films when reacted at 100° C. is about 20% greater than that of corresponding cured red ink films when reacted at room temperature. When the modulus values are measured at 50° C., however, the storage modulus of the cured red ink film prepared at 100° C. is a factor of 10 higher than the storage modulus of the corresponding cured red ink film prepared at 23° C. The increased storage modulus values provided in Examples 6-7 are a consequence of the much higher glass transition temperatures achieved for cured red ink layer coatings when curing the red ink layer materials at higher temperature.

As provided herein, Examples 1-7 provide data that demonstrates when using the same cure conditions, the glass transition temperature ($T_{g\text{-}ink}$) of the cured ink films was significantly higher when the ink layer materials were cured at a higher temperature. Additionally, the ribbon adhesion performance was observed to increase or improve when the ink layer material was applied at a secondary coating temperature ($T_{sec}$) entering the ink applicator of less than ($T_{g\text{-}ink}$+20° C.). Similarly, the performance of the ink layer on the fiber in a ribbon matrix was observed to decrease or lower when the ink layer material was applied at a secondary coating temperature ($T_{sec}$) entering the ink applicator above ($T_{g\text{-}ink}$+40° C.).

What is claimed is:

1. An optical fiber comprising:
an optical waveguide; and
a cured secondary coating layer surrounding the optical waveguide, the cured secondary coating layer having a glass transition temperature ($T_{g\text{-}sec}$) that is greater than or equal to 75° C.; and
a cured ink coating layer surrounding the secondary coating layer;
wherein the cured ink coating layer comprises a coloring agent and has a glass transition temperature ($T_{g\text{-}ink}$) greater than or equal to 75° C.

2. The optical fiber of claim 1, wherein the glass transition temperature ($T_{g\text{-}ink}$) of the cured ink coating layer is greater than or equal to 90° C.

3. The optical fiber of claim 1, wherein the cured secondary coating layer has a glass transition temperature ($T_{g\text{-}sec}$) that is greater than or equal to 75° C. and less than or equal to 120° C.

4. The optical fiber of claim 1, further comprising a cured primary coating layer surrounding the optical waveguide, wherein the cured secondary coating layer surrounds the cured primary coating layer.

5. An optical fiber comprising:
an optical waveguide;
a cured primary coating layer surrounding the optical waveguide;
a cured secondary coating layer surrounding the cured primary coating layer wherein the cured secondary coating layer has a glass transition temperature ($T_{g\text{-}sec}$) greater than or equal to 75° C.; and
a cured tertiary ink coating layer surrounding the cured secondary coating layer, the cured tertiary ink coating layer comprising a coloring agent, wherein the cured tertiary ink coating layer has a glass transition temperature ($T_{g\text{-}ink}$) of greater than or equal to 75° C.

6. The optical fiber of claim 5, wherein the glass transition temperature ($T_{g\text{-}ink}$) is less than or equal to 120° C.

7. The optical fiber of claim 5, wherein the glass transition temperature ($T_{g\text{-}sec}$) is less than or equal to 120° C.

8. A method for manufacturing an optical fiber, the method comprising:
drawing an optical waveguide from a glass preform at a rate greater than 30 m/s, the drawing comprising:
applying a first coating material to surround the optical waveguide;
curing the first coating material to form a cured first coating layer;
applying an ink coating material to surround the cured first coating layer, the ink layer coating material comprising a coloring agent, the cured first coating layer having a temperature ($T_{sec}$) greater than or equal to 50° C. during the applying ink coating material; and
curing the ink coating material to form a cured ink coating layer, the cured ink coating layer having a glass transition temperature ($T_{g\text{-}ink}$) greater than or equal to 75° C.;
wherein the temperature of the cured first coating layer ($T_{sec}$) is less than or equal to $T_{g\text{-}ink}$+40° C.

9. The method of claim 8, wherein the first coating material comprises an acrylate compound.

10. The method of claim 8, wherein the temperature of the cured first coating layer ($T_{sec}$) is less than or equal to $T_{g\text{-}ink}$+20° C.

11. The method of claim 8, wherein the temperature of the cured first coating layer ($T_{sec}$) is less than or equal to $T_{g\text{-}ink}$.

12. The method of claim 8, wherein the ink layer material has a heat of cure reaction ($\Delta H_{rxn}$) less than −70 J/g.

13. The method of claim 8, further comprising:
applying a second coating material to surround the optical waveguide; and
curing the second coating material to form a cured second coating layer;
wherein the cured first coating layer surrounds the cured second coating layer.

14. The method of claim 13, wherein the second coating material has a heat of cure reaction ($\Delta H_{rxn}$) less than −70 J/g.

15. The method of claim 8, wherein the first coating material has a heat of cure reaction ($\Delta H_{rxn}$) less than −80 J/g.

16. The method of claim 8, wherein the cured first coating layer has a glass transition temperature ($T_{g\text{-}sec}$) greater than or equal to 65° C.

17. The method of claim 8, wherein the optical waveguide is drawn at a rate greater than 40 m/s.

* * * * *